United States Patent [19]

Hatz

[11] 4,149,512

[45] Apr. 17, 1979

[54] INTERNAL COMBUSTION ENGINE HAVING A NOISE DEADENING SHROUD

[75] Inventor: Ernst Hatz, Ruhstorf, Fed. Rep. of Germany

[73] Assignee: Motorenfabrik Hatz GmbH & Co. KG, Ruhstorf, Fed. Rep. of Germany

[21] Appl. No.: 712,778

[22] Filed: Aug. 9, 1976

[30] Foreign Application Priority Data

Oct. 23, 1975 [DE] Fed. Rep. of Germany ....... 2547523

[51] Int. Cl.² ............................................. F02B 77/00
[52] U.S. Cl. .............................. 123/198 E; 123/41.64; 123/195 C; 123/195 S; 181/204
[58] Field of Search ............ 123/198 E, 195 C, 195 S, 123/195 R, 41.64; 181/204, 227, 228, 256

[56] References Cited

U.S. PATENT DOCUMENTS

| | | | |
|---|---|---|---|
| 2,123,358 | 7/1938 | Grutzner | 123/198 E |
| 2,177,687 | 10/1939 | Bracken et al. | 123/198 E |
| 3,684,053 | 8/1972 | Fachbach et al. | 123/198 E X |
| 3,866,580 | 2/1975 | Whitehurst et al. | 123/41.64 X |
| 3,924,597 | 12/1975 | Hatz et al. | 123/198 E |
| 3,964,462 | 6/1976 | Thien et al. | 123/198 E |
| 4,011,849 | 3/1977 | Latham | 123/198 E |

*Primary Examiner*—Ira S. Lazarus
*Attorney, Agent, or Firm*—Blanchard, Flynn, Thiel, Boutell & Tanis

[57] ABSTRACT

An internal combustion engine having a sound-deadening shroud surrounding the engine block and connected to latter with the interposition of anti-vibration means. An exhaust plant through which combustion gases are connected is arranged external of the shroud and connected to the engine block. A separate enclosure is secured to the shroud and encloses the exhaust plant leaving a small air gap on all sides between the exhaust plant and the enclosure with only the exhaust pipe of the exhaust plant projecting from the enclosure through an opening.

2 Claims, 9 Drawing Figures

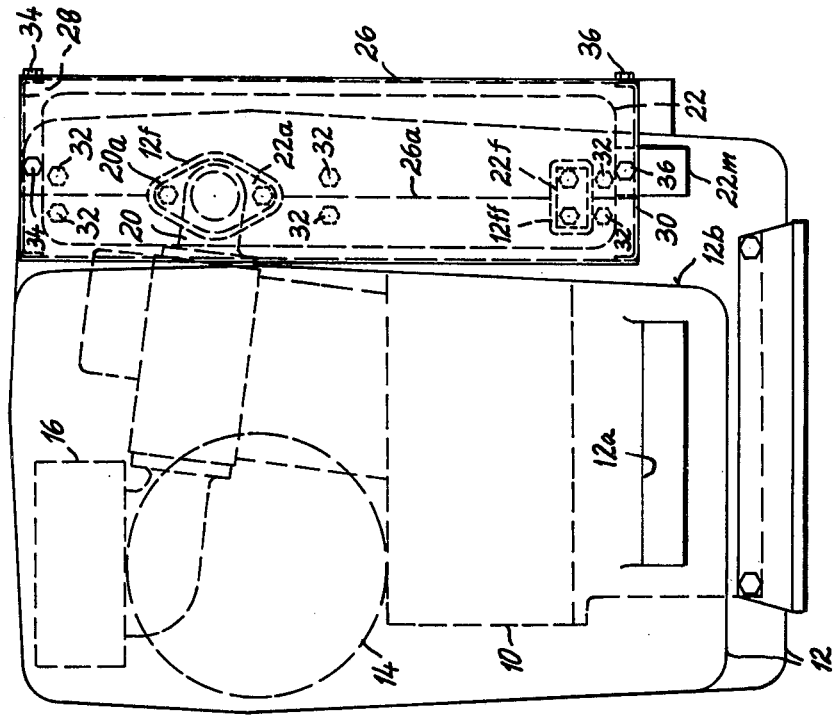
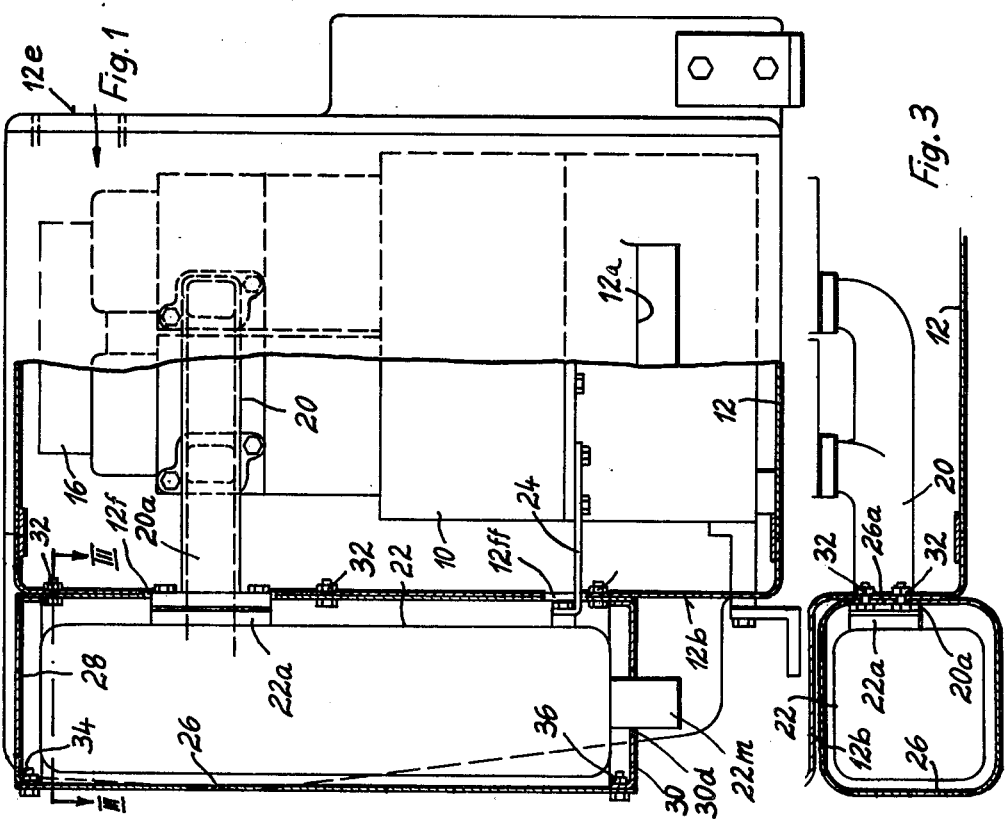

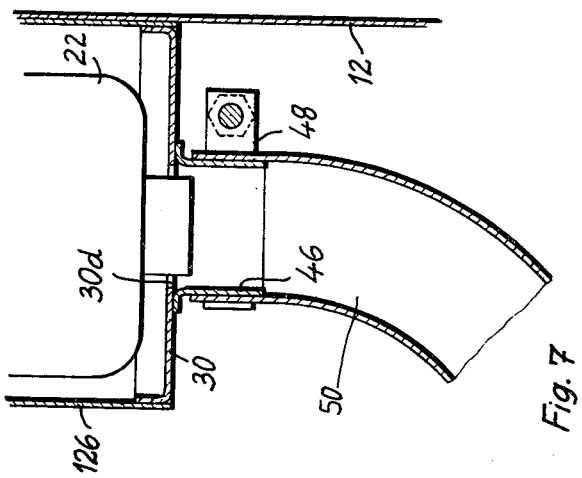
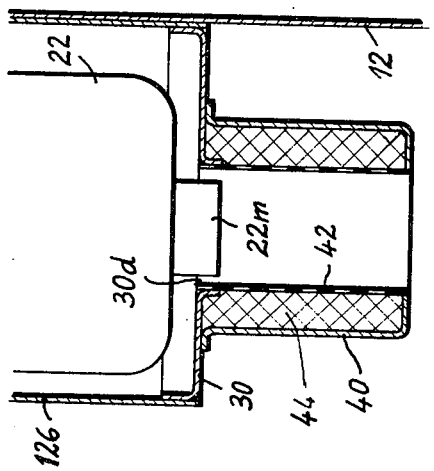
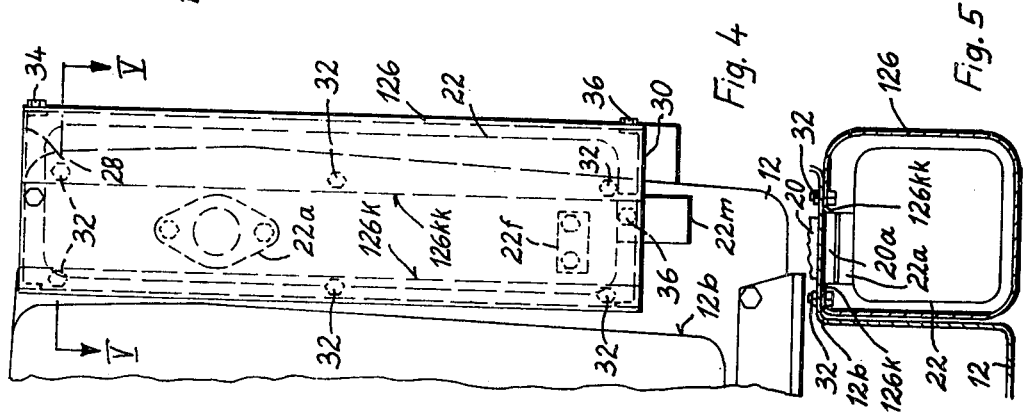

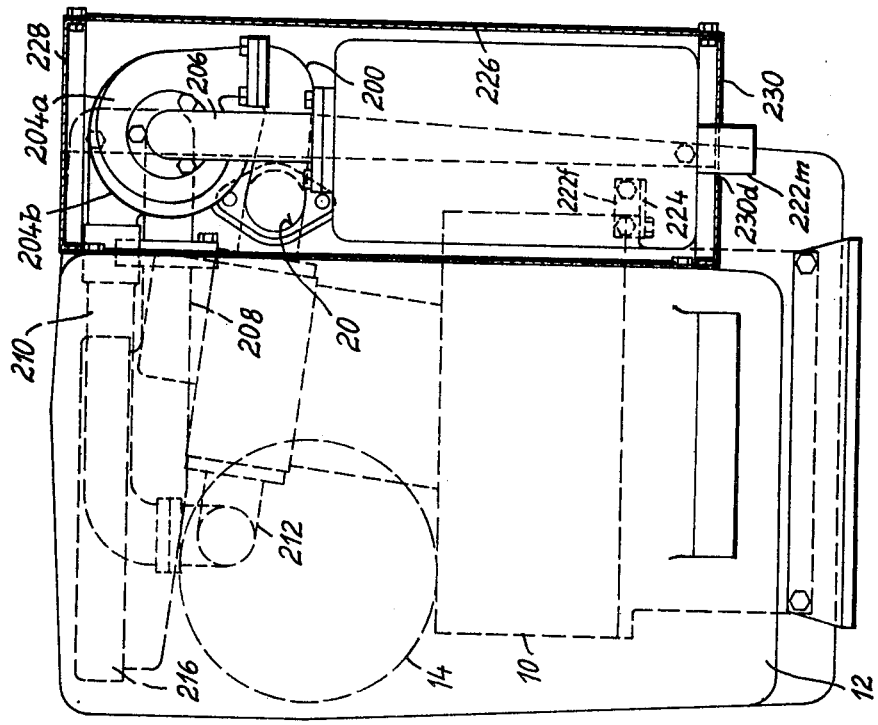
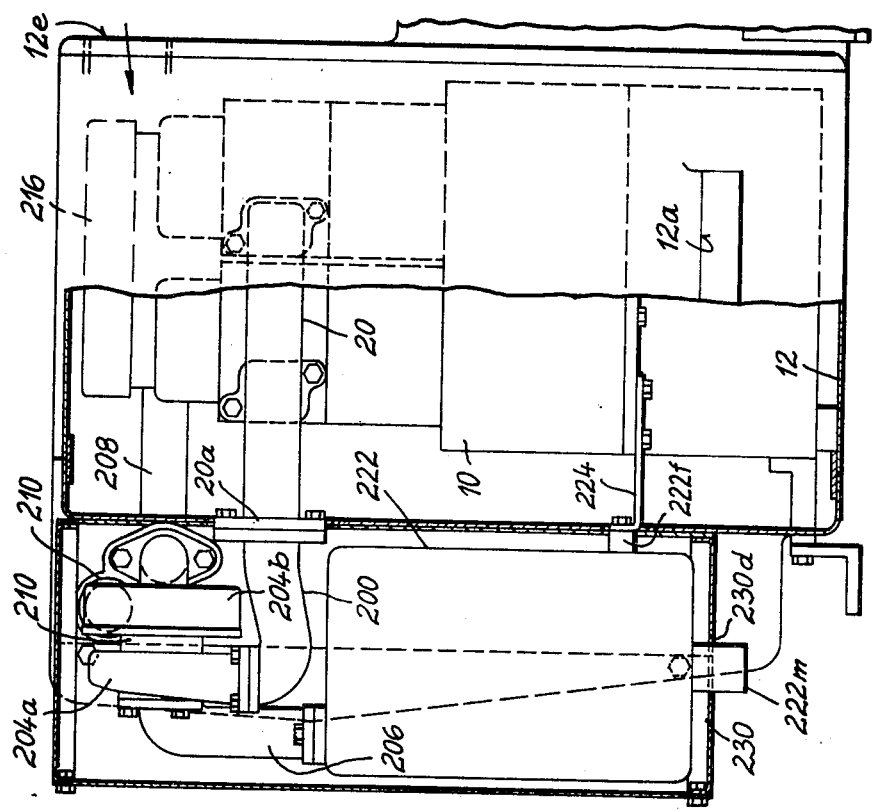

INTERNAL COMBUSTION ENGINE HAVING A NOISE DEADENING SHROUD

FIELD OF THE INVENTION

This invention relates to an internal combustion engine with a shroud surrounding the engine block thereof for the purpose of deadening sound, this shroud being connected to the block with the interposition of anti-vibration means.

BACKGROUND OF THE INVENTION

In internal combustion engines of this kind, the exhaust plant usually includes merely a silencer which is arranged externally of the shroud, because disposition of the same within the shroud would make the supervision and servicing very difficult, which in turn could make for serious damage. The tightening of the noise of the exhaust silencer which is disposed externally of the shroud and secured to the engine block is usually performed by wrapping this silencer in sound-deadening layers of suitable material, for example rock wool, which moreover may be held together by a jacket of sheet metal which completely surrounds the silencer. It has been found, however, that as a result of heavy vibrations of the silencer and the metal jacket, which can be induced from the engine block during operation of the engine, the aforesaid interposed layers can be badly damaged in places where, for example, there is a direct engagement, that is to say material contact, between the silencer and its metal jacket. These areas then transmit the vibration to the exterior, wherefore in this construction the noise abatement at the exhaust silencer is considerably reduced, and may even be completely negatived.

Now it is an object of the present invention to avoid this drawback of the known exhaust silencing system and provide a secure, efficient but nevertheless economical type of silencing system.

This object is met in the present invention by the fact that the combustion gases are conducted through an exhaust plant of known form arranged externally of the shroud and connected to the engine block, and that a separate enclosure is provided and secured to the shroud, this enclosing the exhaust plant leaving the small air gap on all sides between the plant and the enclosure with only the exhaust pipe of the plant projecting from the enclosure through an opening. In this way, there is an air layer between the exhaust elements and the enclosure on all sides which prevents direct transmission to the enclosure of vibrations from the exhaust elements which are mounted on the engine block, this having a very powerful noise deadening effect. In addition, this cushion of air inhibits the vibrations of the outer walls of the elements, which can be produced by heavy pressure fluctuations in the exhaust gases (wall pulsations), to be transmitted to the enclosure. These pulsations are also prevented from becoming manifest as damaging air. The enclosure is carried entirely by the shroud and has no contact with the exhaust elements or the engine block. The shroud itself is in turn connected to the engine block with the interposition of anti-vibration means. In this way, the enclosure is adequately screened against undesirable transmission of vibrations from the engine block. In accordance with another feature of the invention, the enclosure is made of sheet metal. By this means, the accepted recognition of the fact that a sheet metal wall alone acts as a very good noise-dampening means is utilized in the present case to increase the deadening effect.

Moreover, sheet metal as a material for the enclosure confers advantages in the production. In the case of exhaust plants with silencers of the known elongated form, in accordance with an embodiment of the invention, the enclosure comprises a jacket which encloses the silencer from the sides and is connected to the shroud, and two covers connected to the jacket, one of these covers having an opening for the passage of the exhaust pipe from the silencer. To avoid contact between the silencer and the enclosure in the event of vibration of the latter, this silencer is secured to the exhaust manifold secured firmly to the engine block and additionally to a support element firmly anchored to the engine block.

The arrangement of the exhaust silencer and the enclosure can be suited to local requirements at any suitable part of the engine. In the case of internal combustion engines with a cooling air fan which conducts air into the spaces between the block and the shroud, it is, however, particularly advantageous to adopt an arrangement in which the enclosure with the silencer is disposed in the vicinity of the exit of the cooling air from the shroud. No heat sealing elements need be introduced at the parts where the enclosure is attached because there is a heat transfer from the enclosure to the air discharge from the shroud and it is, therefore, not detrimental.

A simple automatic heat dispersion from the interior of the enclosure can in addition be achieved in an arrangement with an elongated and substantially vertically-disposed exhauster silencer in a further feature of the invention, in which the enclosure has a free opening, approximately at its uppermost part to vent heated air upwardly from the interior of the enclosure under a thermal effect. In accordance with yet another feature of the invention, a particularly simple constructional arrangement is acquired where a vertically-extending gap is left open between the longitudinal edges of the jacket at the fastened side of the latter to provide a flue for the entry and exit of air.

In order, further, to reduce the muzzle noise of the exhaust silencer, in accordance with a further feature of the invention, use is made of a muzzle silencer which is secured to the cover concentrically with the passage opening in the latter and freely surrounds the exhaust pipe of the latter.

To conduct the combustion gases to a suitable part of the surroundings, in accordance with a further feature of the invention, a rigid or flexible extension pipe is secured to the cover concentrically with the opening in the latter, and the exhaust pipe of the silencer opens into this to provide a simple discharge for waste gas at the required point.

BRIEF DESCRIPTION OF THE DRAWINGS

A number of examples of embodiment of the invention are described hereafter in reference to the accompanying drawings, in which:

FIGS. 1 and 2 are a longitudinal section and side view, respectively, of a first embodiment of the enclosure for the silencer;

FIG. 3 is a cross section through the enclosure taken on the line III—III of FIG. 1;

FIG. 4 is a side view of a second constructional form of the enclosure;

FIG. 5 is a cross section on the line V—V of FIG. 4;

FIGS. 6 and 7 show details of the enclosure in cross section and on a larger scale; and FIGS. 8 and 9 illustrate a third embodiment of the enclosure for the exhaust unit, and exhaust silencer and a preceding turbo supercharger.

DETAILED DESCRIPTION

The first embodiment in FIGS. 1 to 3 is a twin-cylinder engine, the engine block 10 of which is enclosed in a multi-part shroud 12 for deadening the noise, this shroud being connected to the engine block with the interposition of anti-vibration means (not shown). A shroud of this nature can have any appropriate form and connected to the casing by any appropriate means, as for example in U.S. Pat. No. 3,924,597. The engine includes a cooling air fan 14 of known form to draw the cooling air through an inlet opening 12e into the shroud and through interspaces inside the shroud, this cooling air leaving the shroud at 12a. The air drawn in by the fan is also passed through the air filter 16 and hence out of the cylinders as combustion air.

The combustion gases are educted from the two cylinders in known fashion through a manifold 20 which is firmly anchored to the cylinders by fastening screws. The manifold has a flange 20a which projects through an opening 12f of the shroud to be connected by screws to the flange 22a of an elongated silencer 22 of known type and function which is disposed externally of the shroud. The silencer 22 is disposed upright in a recess 12b of the shroud 12 in the vicinity of the exit duct 12a for the cooling air. A support plate 24 projects through a further opening 12ff in the shroud 12 and is connected to the silencer 22 at 22f. The parts 20a and 24 thus form two widely spaced fixed anchorage points for the heavy large volume silencer 22 and provide for a stable mounting of the latter on the engine block 10. The downwardly projecting exhaust pipe of the silencer 22 is designated 22m.

The silencer is fully surrounded by an enclosure comprising a jacket 26 and two covers 28 and 30. The two longitudinal sides of the jacket 26 butt together at 26a and are secured by a number of screws 32 directly to a side wall of the recesses 12b. Openings at the two longitudinal sides of jacket 26 constitutes two passages registering with the openings 12f and 12ff and allowing a free access to the anchorage points 20a and 24 of silencer 22. The covers 28 and 30 are connected to the upper and lower sides of the jacket 26 respectively by screws 34 and screws 36. A central opening 30d of cover 30 allows the passage of the exhaust pipe 22m from the silencer 22.

As has already been pointed out, the enclosure 26, 28, 30 is exclusively carried by the shroud 12 and has no contact with the silencer 22 or the engine block 10. The shroud itself is mounted on the engine block with the intermediary of anti-vibration means. Thus, the enclosure is adequately screened from undesirable conduction of vibration from the engine block.

It is further to be noted that the enclosure surrounds the silencer on all sides leaving an air gap which is sufficiently dimensioned so that even heavy vibrations of the silencer transmitted from the engine block can produce at no point any material contact between the silencer and the enclosure. Even where there are vibrations (pulsations) of the outer walls of the silencer, produced by fluctuations in the exhaust stream, there is no material contact between the silencer and the enclosure. The latter thus functions to provide an effective screening of the silencer against body noise or air radiated noise. By this means the constructional form described provides a considerable reduction in noise at the exhaust silencer 22 for a minimum expense.

The enclosure confers the advantage of providing an efficient heating insulation of the silencer against the surroundings. At one narrow side only, namely the longitudinal side 26a, it is screwed to the shroud 12, which means that its five other sides are free for the dispersion of heat to the ambient atmosphere. It should here be noted that, if needed, an additional opening can be provided in the upper cover 28 to permit the air, heated by the thermal action, to escape from the interior of the enclosure, cold air flowing into the latter through the opening 30d in the lower cover 30. The caters for an automatic cooling of the silencer as well as the enclosure for the latter.

A particular method of performing this cooling is illustrated in the embodiment shown in FIGS. 4 and 5. The jacket 126 of the enclosure is here such that its longitudinal edges 126k and 126kk do not abut together at the fastening side but define a vertical gap which at the top and bottom by-pass the covers 28 and 30 into atmosphere. This provides a flue through which fresh cool air flows into the enclosure from below and leaves at the top as heated air. For the rest, the arrangement and effect of the enclosure in this construction is the same as in that described in connection with FIGS. 1 to 3.

If increased cooling of the enclosure is required, special conduits can be connected from the fan into the enclosure and thence to the exterior to provide for a greater capacity cold air blow through the enclosure. The upwardly-directed openings in the enclosure for the purpose of additional cooling are of narrow cross section only so that they act as gaps which alone will give a sufficient silencing effect. If larger discharge cross sections should be required, sound deadening means (silencing passages) could be arranged beyond these discharge openings.

To enable the muzzle noise to the exhaust silencer to be eliminated or reduced, as shown in FIG. 6, a silencer is provided on the enclosure concentric with the opening 30d of the lower cover 30, this silencer comprising an outer jacket 40 which is fastened to the cover 30 and an inner pipe 42 of sieve form, a layer 44 of sound-deadening material, for example rock wool, being interposed between these tubular parts.

In the construction illustrated in FIG. 7, a pipe section 46 is secured to the lower cover 30 concentric with the opening 32, and a rigid or flexible pipe 50 is clamped thereto by means of a clip 48, this pipe 50 enabling the discharge gases leaving the silencer 22 and 22m to be vented at a more remote point. By this means the discharge gases can be taken away to a final discharge point which will comply with anti-pollution regulations. The elements 40 to 50 in the two constructions of FIGS. 6 and 7 are only connected to the enclosure and not to the silencer 22 or the engine block 10. Moreover, it is found that the pressure fluctuations in the exhaust gases after leaving the silencer 22 no longer have the energy in this long pipe to radiate a high degree of air noise. Thus, without additional expense we achieve an arrangement which silences body noise. This, for example will dispense with a sound-deadening wrapping around the long conduit 50 and this means a further saving of expense.

In the embodiment illustrated in FIGS. 8 and 9, the exhaust unit in addition to the exhaust silencer 222 includes an upstream turbo supercharger of known type and effect. An intermediate pipe 200 is connected at 20a to the manifold 20 and to the turbo supercharger 204. The turbine wheel of this supercharger is mounted in a housing 204a and is acted on by the exhaust gases through pipes 20 and 200, these gases then being conducted to the silencer 222 through a pipe section 206. Mounted in the chamber 204b of the housing is a pump wheel which draws the air from the filter 216 through the conduit 208 and passes it as combustion air through conduits 210,212 to the individual cylinders.

In this construction, the enclosure again consists of a sheet metal jacket 226 and two covers 228,230. The jacket is screwed to the shroud 12, and the covers are connected to the jacket by fastening screws. The exhaust pipe 222m of the silencer 222 projects downwards at 230d through cover 230. The support plate 224 supports here the silencer 222 and 222f. The enclosure 226, 228, 230 here has the same effect as in the two constructions described above, that the sole difference is that in this last-mentioned construction the noise generated by the turbo supercharger is also deadened in the enclosure.

As has been explained in the arrangement according to the invention, all noise (body noise, air noise, muzzle noise) created by the exhaust plant (exhaust silencer and/or supercharger) is reduced to a very extensive degree. The means for building the silencing arrangement are of simple form and of extended life, and their application to the engine requires no great expense. The arrangement is, therefore, economically very viable.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. The combination of an internal combustion engine having a sound-deadening shroud surrounding an engine block and connected to said engine block with the interposition of anti-vibration means, an exhaust silencer having an exhaust pipe for combustion gases arranged external of said shroud and connected to said engine block, an enclosure defining a chamber therein separate from the interior of said shroud and enclosing said exhaust silencer, said enclosure being secured to said shroud and having means defining an opening therein, said exhaust silencer being smaller in size than said chamber to define a small air gap between said exhaust silencer and said enclosure with said exhaust pipe projecting from said enclosure through said opening.

2. An internal combustion engine according to claim 1, wherein said enclosure is made of sheet metal.

* * * * *

UNITED STATES PATENT AND TRADEMARK OFFICE
CERTIFICATE OF CORRECTION

PATENT NO. : 4 149 512
DATED : April 17, 1979
INVENTOR(S) : Ernst Hatz

It is certified that error appears in the above-identified patent and that said Letters Patent are hereby corrected as shown below:

Column 6, lines 28 and 29; delete in their entirety and substitute therefor the following:

---2. The combination according to claim 1, further including an upstream turbo supercharger, through which the combustion gases are conducted, arranged external of said shroud; and wherein said enclosure encloses both said exhaust silencer and said turbo supercharger.---.

Signed and Sealed this

Thirty-first Day of July 1979

[SEAL]

Attest:

Attesting Officer

LUTRELLE F. PARKER
Acting Commissioner of Patents and Trademarks